United States Patent
Hall

[19]

[11] Patent Number: 6,078,571

[45] Date of Patent: *Jun. 20, 2000

[54] APPARATUS AND METHOD FOR TRANSMITTING BEACON SIGNALS IN A COMMUNICATION SYSTEM

[75] Inventor: Scott M. Hall, Fort Worth, Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/934,362

[22] Filed: Sep. 19, 1997

[51] Int. Cl.[7] .............................. H04Q 7/00; H04Q 7/38
[52] U.S. Cl. ........................................... 370/331; 455/442
[58] Field of Search .................................... 370/320, 322, 370/324, 329, 331, 334, 335, 342, 350; 375/200; 455/436, 439, 440, 442, 443, 456, 525

[56] References Cited

U.S. PATENT DOCUMENTS

| | | | |
|---|---|---|---|
| 5,459,873 | 10/1995 | Moore et al. | 370/334 |
| 5,479,397 | 12/1995 | Lee | 370/331 |
| 5,485,631 | 1/1996 | Bruckert | 370/334 |
| 5,640,414 | 6/1997 | Blakeney, II et al. | 375/200 |
| 5,680,395 | 10/1997 | Weaver, Jr. et al. | 370/331 |
| 5,787,346 | 7/1998 | Iseyama | 370/331 |
| 5,805,575 | 9/1998 | Kamin, Jr. | 370/331 |
| 5,825,762 | 10/1998 | Kamin, Jr. et al. | 370/335 |
| 5,825,835 | 10/1998 | Kingston et al. | 370/335 |

*Primary Examiner*—Chau Nguyen
*Assistant Examiner*—Chiho Andrew Lee
*Attorney, Agent, or Firm*—Richard A. Sonnentag; Mario J. Donato, Jr.

[57] ABSTRACT

A single transmitter (109) controlled to transmit at appropriate beacon signal frequencies (F1–F3) is scanned through each of the frequencies (F1–F3) so that a mobile station (101) can determine when a hard handoff to different frequencies (F4–F6) is required. The beacon signal transmitter (109) is controlled by a controller (112) to transmit beacon signals which include a pilot channel only, pilot/sync channels, pilot/page/sync channels common to each of the frequencies (F1–F3), or pilot/page/sync channels different for each of the frequencies (F1–F3). Additional control is provided by the controller (112) such that each of frequencies (F1–F3) is further transmitted to different sectors (A1–A3) when the coverage area supported by a target base-station (106) is sectorized.

20 Claims, 5 Drawing Sheets

APPARATUS AND METHOD FOR TRANSMITTING BEACON SIGNALS IN A COMMUNICATION SYSTEM

FIELD OF THE INVENTION

The present invention relates, in general, to communication systems and, more particularly, to transmitting beacon signals in such communication systems.

BACKGROUND OF THE INVENTION

In current code-division multiple access (CDMA) communication systems, the handoff of a mobile station's communication from one frequency to another frequency, referred to as "hard handoff," presents a problem. The biggest problem presented during a CDMA hard handoff is due to MAHO (Mobile Assisted Handoff). Specifically, it is difficult for the mobile station to determine the location at which hard handoff should take place. One solution to the hard handoff problem in CDMA is to use a so-called "beacon signal" to cause mobile stations to "soft handoff" (i.e., handoff from one frequency spread with one pseudo-noise (PN) offset) to the same frequency with a different PN offset). Typically, the source and the target channels are separated by a boundary and are in different areas of the CDMA cellular radiotelephone system, or could be operated separately by two separate operators. After a soft handoff occurs over the boundary, a hard handoff within the common target CDMA cellular radiotelephone system is performed as is known in the art.

Problems with the beacon signal solution remain. For example, for CDMA communication systems which are multi-frequency, one corresponding beacon signal is required for each frequency provided by the source CDMA communication system. This problem is magnified when both the source and the target CDMA communication systems become sectorized. Finally, providing additional transmitters corresponding to the multi-frequencies of the source CDMA cellular radiotelephone system is costly since a dedicated transmitter is required to transmit each beacon signal.

Thus a need exists for an apparatus and method which overcome the deficiencies of the prior art.

DETAILED DESCRIPTION OF THE PREFERRED EMBODIMENT

Figure 1:
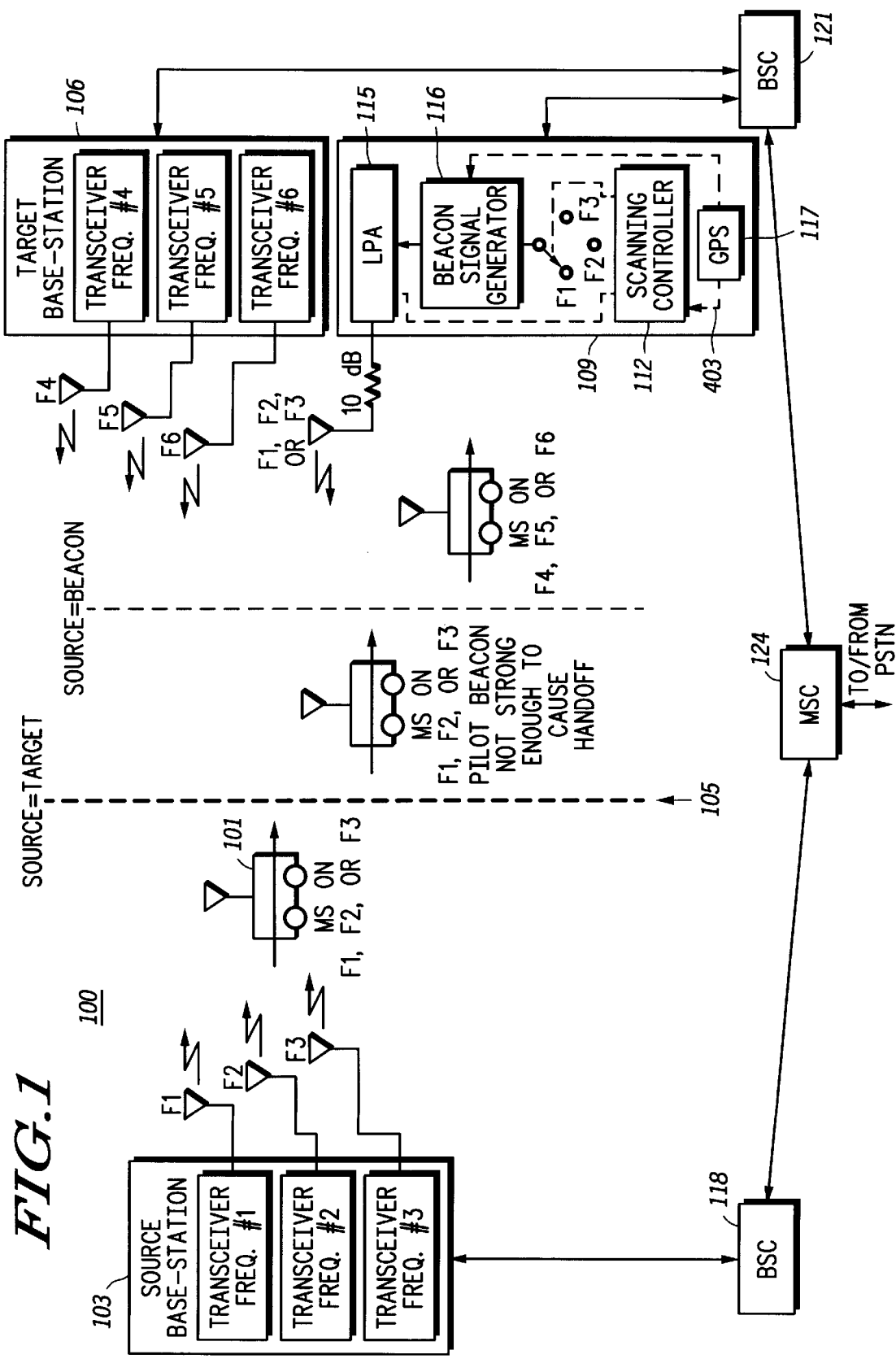
FIG. 1 generally depicts a communication system which beneficially employs beacon signal scanning in accordance with the invention.

A single transmitter controlled to transmit at appropriate beacon signal frequencies is scanned through each of the frequencies so that a mobile station can determine when a hard handoff to different frequencies is required. The transmitter is controlled by a controller to transmit beacon signals which include a pilot channel only, a pilot/sync channel, pilot/page/sync channels common to each of the frequencies, or pilot/page/sync channels different for each of the frequencies. Additional control is provided by the controller such that each of frequencies are further transmitted to different sectors when the coverage area supported by a target base-station is sectorized.

Stated generally, an apparatus for transmitting a plurality of beacon signals in a communication system is described in accordance with the invention. The plurality of beacon signals have a corresponding plurality of different frequencies and are utilized primarily to initiate handoff of a mobile station from a first frequency to a second frequency. The apparatus comprises a transmitter for transmitting the beacon signals at the corresponding plurality of different frequencies and a controller for controlling the time at which the transmitter transmits the beacon signals at the corresponding plurality of different frequencies. Stated slightly differently, the controller also controls the transmitter to transmit the beacon signals at times different from one another. A corresponding method implemented by the apparatus in accordance with the invention is also described herein.

In the preferred embodiment, the communication system further comprises a code division multiple access (CDMA) wireless communication system. The controller is either synchronous or asynchronous with the CDMA wireless communication system. The plurality of beacon signals may include a signal having a pilot channel, a signal having a pilot and synchronization channels, a signal having a pilot, page and synchronization channels which are common to the beacon signals or different from one beacon signal to another. The apparatus further includes a means for accepting input related to an assignment of the different pilot, page and synchronization channels for each of the plurality of beacon signals. In an alternate embodiment, the apparatus is configured such that the transmitter for transmitting the beacon signals at the corresponding plurality of different frequencies is periodically switched to a different sector of a coverage area.

Also described herein in accordance with the invention is a communication system for handing off a mobile station from a first frequency to a second frequency, the communication system comprises, at a target coverage area, a means for transmitting a plurality of beacon signals at a corresponding plurality of different frequencies and a means for controlling the time at which the transmitter transmits the beacon signals having the corresponding plurality of different frequencies. At a mobile station, a means, based on a received one of the beacon signals, is included for determining that handoff from the first frequency to the second frequency is required and for initiating the handoff. At a controller, a means is included for instructing the mobile station to handoff from the first frequency to the second frequency based on information related to the initiation of the handoff.

The communication system is a code division multiple access (CDMA) wireless communication system. In the communication system, the mobile station communicates with a source base-station via a communication signal having a first frequency from the plurality of different frequencies and the mobile station initiates the handoff based on a comparison between the communication signal having the first frequency from the plurality of different frequencies and the received one of the beacon signals having the first frequency. Specifically, the mobile station initiates the handoff based on a comparison of $E_c/I_o$ between the communication signal having the first frequency from the plurality of different frequencies and the received one of the beacon signals having the first frequency.

FIG. 1 generally depicts a CDMA communication system which may beneficially implement the present invention. In the preferred embodiment, the CDMA communication system is a CDMA cellular radiotelephone system compatible with IS-95A, *"Mobile Station-Base Station Compatibility Standard for Dual-Mode Wideband Spread Spectrum Cellular System"* and published by the Electronic Industries Association (EIA), 2001 Eye Street, N.W., Washington, D.C. 20006) for Digital Cellular Systems (DCS) and ANSI-J-STD-008 for Personal Communication Systems (PCS). As shown in FIG. 1, a mobile station (MS) 101 is shown in CDMA communication with a source base-station 103. In the preferred embodiment, the source base-station 103 provides omni-directional antenna coverage to MS 101, but one skilled in the art will recognize that source base-station 103 could equally provide sectorized antenna coverage to MS 101. In this exemplary configuration of FIG. 1, source base-station 103 provides CDMA communication to MS 101 via frequencies F1–F3 and thus MS 101 will only communicate to source base-station 103 via a traffic channel (TCH) on frequency F1, F2 or F3 while in the coverage area of source base-station 103. One skilled in the art will further appreciate that any number of frequencies could be implemented depending on the requirements of the CDMA communication system.

As MS 101 moves from the coverage area of source base-station 103 beyond a boundary 105 and into a coverage area provided by a target base-station 106, hard handoff of MS 101 is required. This is true since target base-station 106 only supports CDMA communication on frequencies F4–F6 and not frequencies F1–F3. It is this exact scenario which causes problems with hard handoff in CDMA communication systems as described above.

To overcome the deficiencies of the prior art, an apparatus 109 for transmitting a plurality of beacon signals in the CDMA communication system is provided in accordance with the invention. The apparatus 109 as depicted in FIG. 1 is shown to be generally within a target coverage area; in a real system implementation the apparatus 109 is substantially co-located with the target base-station 106. As shown in FIG. 1, a scanning controller 112 controls a transmitter, which in the preferred embodiment is a linear power amplifier (LPA) 115 and a beacon signal generator 116, such that LPA 115 scans on each of the frequencies F1–F3 for a period of time which is long enough to allow MS 101 to determine that a handoff is required in accordance with the invention. On the other hand, the period of time is short enough to cause MS 101 to handoff across the boundary 105 before its CDMA communication is impaired in accordance with the invention. A global positioning system (GPS) timing synchronization block 117 is also coupled to beacon signal generator 116 (and scanning controller 112 in a specific embodiment) to provide the requisite timing information.

Figure 2:
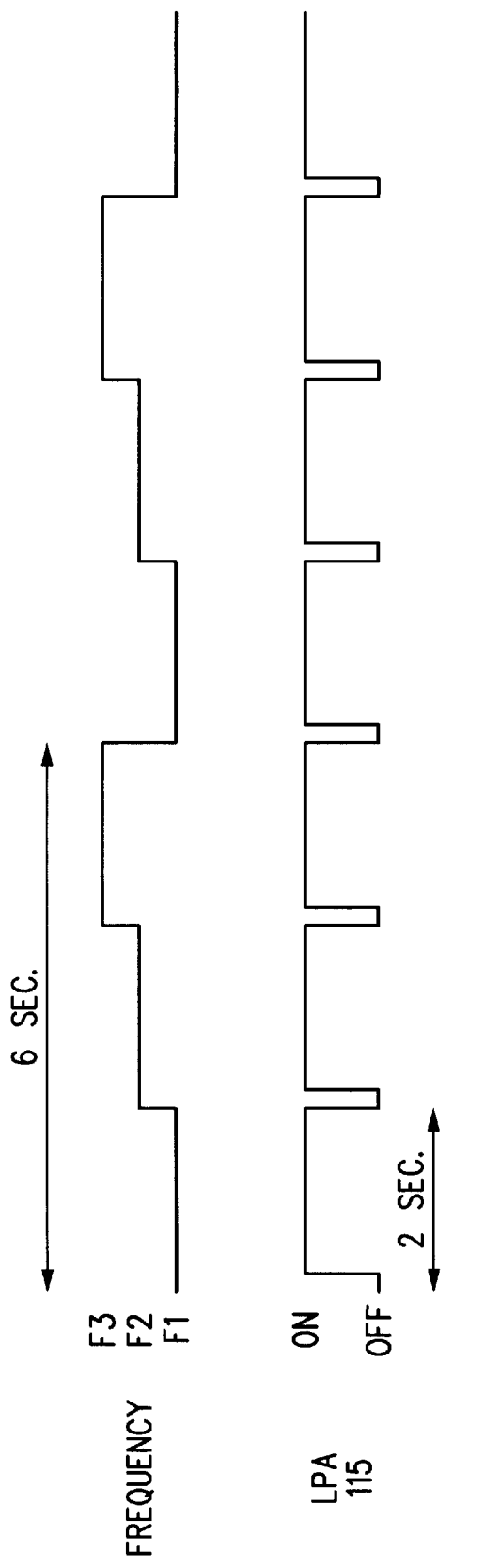
FIG. 2 generally depicts a timing diagram used to beneficially implement beacon signal scanning in accordance with the invention.

FIG. 2 generally depicts an exemplary timing diagram used to beneficially implement beacon signal scanning in accordance with the invention. As shown in FIG. 2, LPA 115 is pulsed on and off approximately every two seconds in the preferred embodiment. During those times when LPA 115 is off, a dummy power supply load (not shown) is switched "on" to reduce the amount of transient ripple introduced into the power supply of LPA 115. As can be seen in FIG. 2, for the first two seconds, LPA 115 transmits at frequency F1; for the next two seconds, LPA 115 transmits at frequency F2 and so on. After six seconds, LPA 115 again transmits at frequency F1 and the cycle of transmission at frequencies F1–F3 continues. In this manner, the beacon signal transmitter 109 in accordance with the invention scans each of the frequencies F1–F3 for a time such that the MS 101 can make a handoff determination. Since, in this example, the number of beacon signal transmitters is reduced by two-thirds, the amount of interference introduced into the target coverage area is correspondingly reduced by two-thirds. Additionally, a two-thirds reduction in dedicated beacon signal transmitters corresponds to a two-thirds cost savings for beacon signal transmitters.

Referring back to FIG. 1, if MS 101 is in CDMA communication with source base-station 103 on frequency F1, a handoff to a TCH on frequency F4, F5 or F6 provided by target base-station 106 is initiated when MS 101 determines that a handoff is required. In the preferred embodiment, MS 101 determines that a handoff is required when, for this example, the transmission at frequency F1 by beacon signal transmitter 109 during a particular two second interval exceeds a threshold. In the preferred embodiment, in CDMA communication systems compatible with IS-95A and ANSI J-STD-008, the threshold is a T_COMP threshold. The T_COMP threshold is essentially a threshold which is 2 dB above the pilot channel transmitted by source base-station 103 and, as seen at MS 101, is in the well-known form of $E_c/I_o$. A base-station controller (BSC) 118 and 121 communicate to one another, via a maintenance and switching center (MSC) 124 to provide the necessary signalling required to affect the hard handoff of the MS 101. The above mentioned IS-95A and ANSI J-STD-008 include all relevant description related to messaging and parameters required for handoff from source base-station 103 to target base-station 106 via BSCs 118 and 121 and MSC 124.

Figure 3:
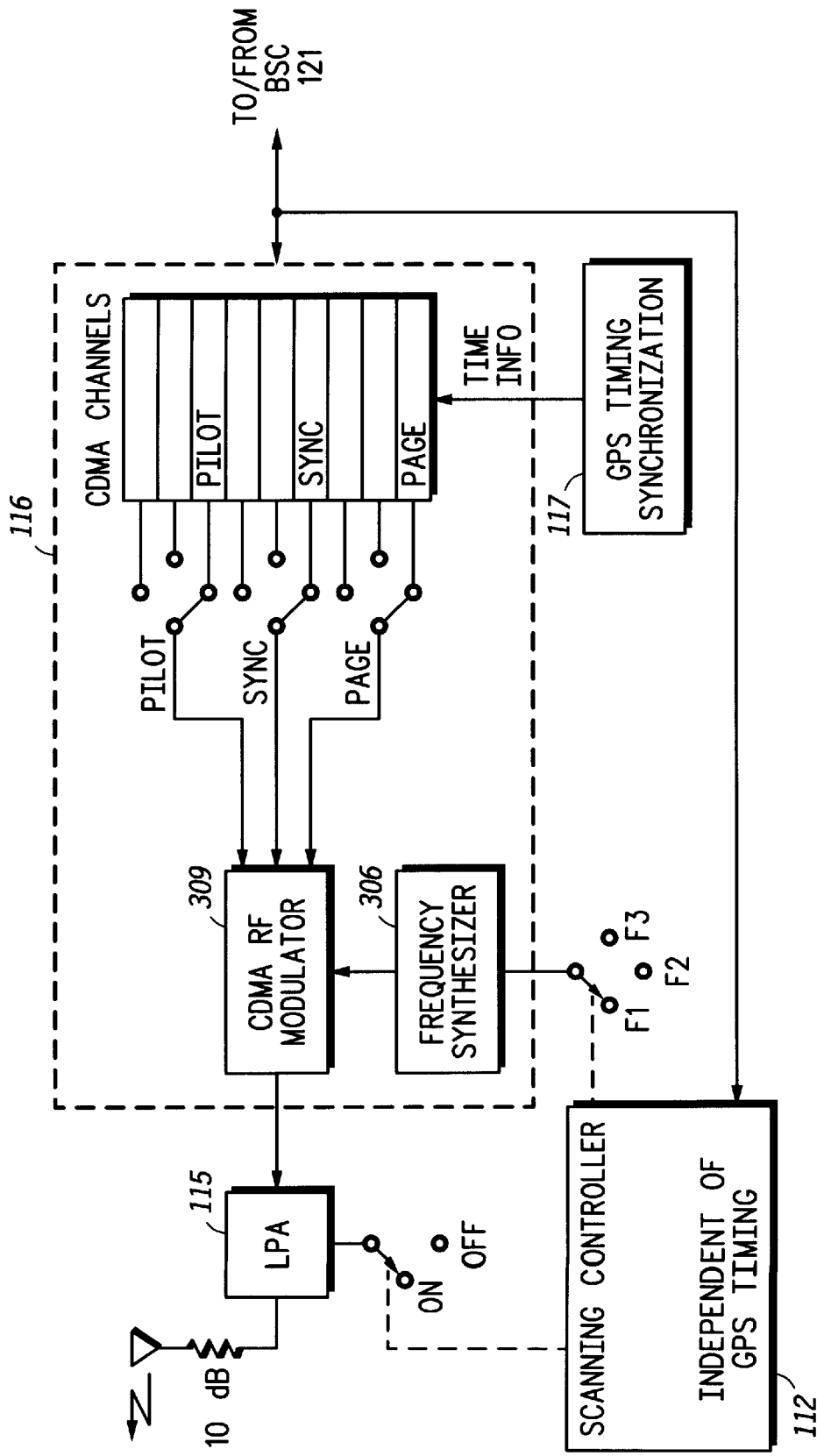
FIG. 3 generally depicts a beacon signal transmitter capable of generating a beacon signal having a pilot channel only or a beacon signal including a common pilot/page/sync channel for each of frequencies F1–F3 in accordance with the invention.

The beacon signals transmitted by beacon signal transmitter 109 may include a pilot channel only, a pilot/sync channel, a pilot/page/sync channel common to each of frequencies F1–F3, or a pilot/page/sync channel different for each of frequencies F1–F3. FIG. 3 generally depicts a beacon signal transmitter 109 capable of generating a beacon signal including a pilot channel only, a pilot/sync channel or a pilot/page/sync channel common for each of frequencies F1–F3 in accordance with the invention. As shown in FIG. 3, the scanning controller 112 is independent of the timing associated with the CDMA pilot/page/sync channels. The CDMA channels receive GPS timing synchronization information from GPS timing synchronization block 117. As the beacon signals at frequencies F1–F3 in this implementation include either a pilot channel alone, a pilot/sync channel or a pilot/page/sync channel common for each of the scanning frequencies F1–F3, scanning controller 112 is independent of GPS timing provided by GPS timing synchronization block 117 and is thus asynchronous with the CDMA communication system timing.

Important to note is that handoff can occur when the mobile station is in one of two modes. In a first mode, when the MS 101 is in CDMA communication on a traffic channel (TCH) at one of frequencies F1–F3 (commonly referred to as "traffic mode"), the beacon signal transmitted by beacon signal transmitter 109 in accordance with the invention need only include a pilot channel. In this situation, signaling from BSC 121 will indicate that a beacon signal including only the pilot channel be transmitted. When the MS 101 is in the traffic mode, the MS 101 generates a Pilot Strength Measurement Message (PSMM) when it determines a handoff is required. The PSMM indicates to MSC 124 that the pilot channel within the beacon signal transmitted by beacon signal transmitter 109 in accordance with the invention and received by MS 101 is 2 dB above the pilot channel transmitted by source base-station 103. In response to the PSMM, MSC 124 generates an Extended Handoff message which instructs MS 101 to switch to one of the frequencies F4, F5 or F6 supported by target base-station 106. The Extended Handoff message includes additional information such as a Walsh code and TCH assignment for use on the new frequency F4, F5 or F6.

In a second mode, when MS 101 is powered on and registered with source base-station 103 but not on a traffic channel (commonly referred to as "idle mode"), a handoff of MS 101 in the idle mode requires that the beacon signal transmitted by beacon signal transmitter 109 in accordance with the invention include pilot/page/sync channels. Again, in this situation, beacon signal generator 116 is instructed via signaling from BSC 121 when MS 101 is in an idle mode and such pilot/page/sync channels require transmission. During an idle mode handoff, no signaling is required. MS 101 will again determine that the pilot channel within the beacon signal transmitted by beacon signal transmitter 109 in accordance with the invention and received by MS 101 is 2 dB above the pilot channel transmitted by source base-station 103, and MS 101 will initiate hard handoff. MS 101 tunes to the paging channel within the beacon signal transmitted by beacon signal transmitter 109 and receives overhead paging messages thereon. Frequency information contained in the overhead messages of the paging channel cause MS 101 to change to one of the frequencies F4, F5 or F6 supported by target base-station 106, thus completing the idle mode hard handoff. Important to note is that during hard handoff in either mode (traffic or idle), scanning controller 112 need not be coupled to GPS timing synchronization block 117 to obtain GPS timing since in these situations beacon signal scanning in accordance with the invention can be accomplished without such GPS timing.

As also shown in FIG. 3, a frequency synthesizer 306 under control of scanning controller 112 is controlled to operate over frequencies F1–F3 in accordance with the invention. The output of frequency synthesizer 306 for the particular time period (as shown in FIG. 2) is output to a CDMA radio frequency (RF) modulator 309 which modulates the particular beacon signal as required by the MS 101 based on its mode of operation (e.g., either traffic or idle mode). The output of modulator 309 is input into LPA 115 which is pulsed on/off as also shown in FIG. 2. In this manner, the scanning operation of FIG. 3 in accordance with the invention transmits a beacon signal which includes either a pilot channel alone, pilot/sync channels or pilot/page/sync channels for each of frequencies F1–F3.

Figure 4:
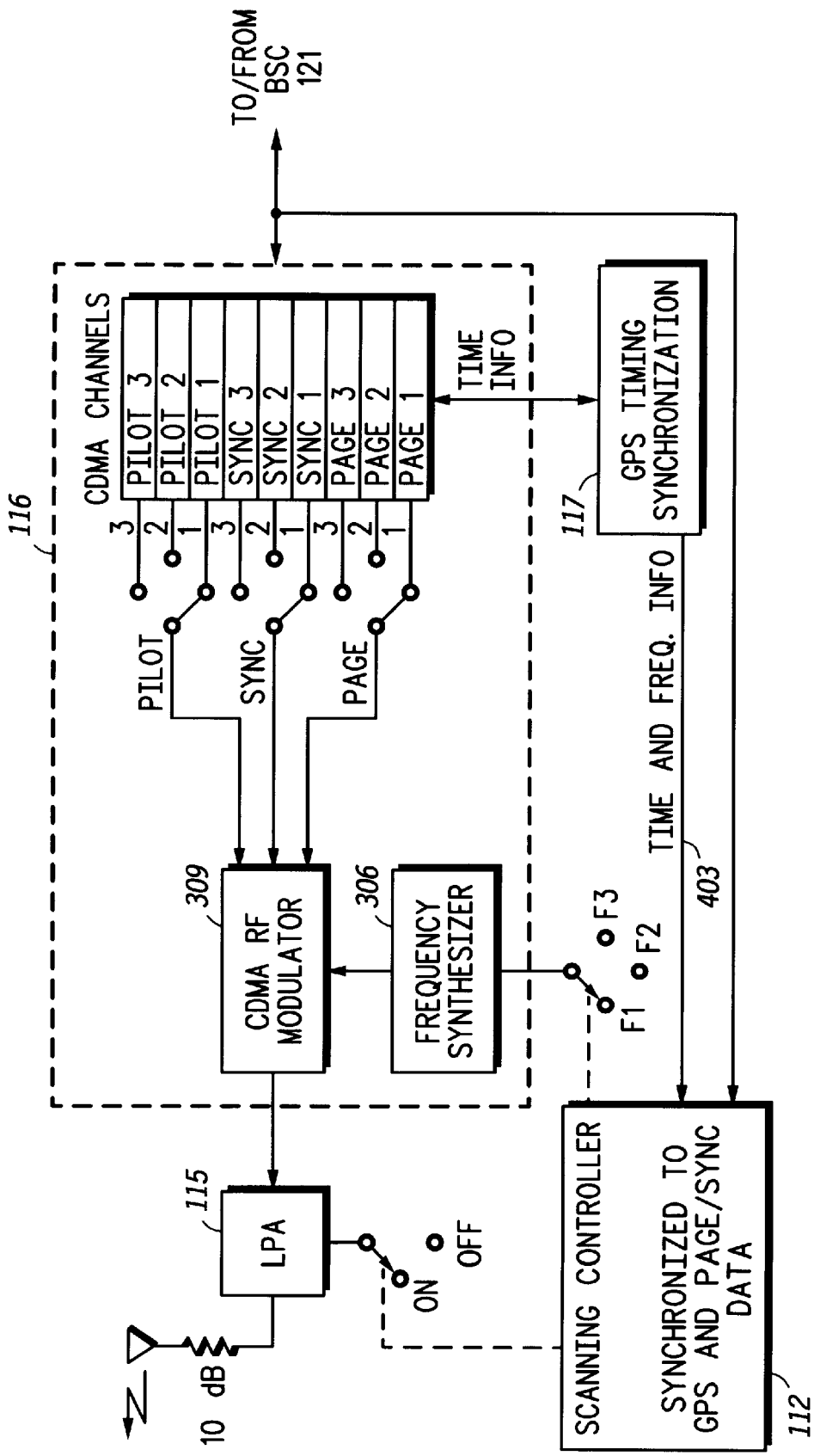
FIG. 4 generally depicts a beacon signal transmitter capable of generating a beacon signal including a pilot/page/sync channels which are different for each of frequencies F1–F3 in accordance with the invention.

FIG. 4 generally depicts a beacon signal transmitter 109 capable of generating a beacon signal including pilot/page/sync channels which are different for each of frequencies F1–F3 in accordance with the invention. The CDMA channels receive GPS timing synchronization information from GPS timing synchronization block 117. As shown in FIG. 4, the scanning controller 112 accepts time and frequency information from block 117 via signal 403 and is thus synchronized to the GPS and page/sync channel data output from the GPS timing synchronization block 117. As the beacon signals at frequencies F1–F3 in this implementation include pilot/page/sync channels which are different for each of the scanning frequencies F1–F3, scanning controller 112 is dependent on GPS timing provided by block 117 and is thus synchronous with the CDMA communication system timing. As in the various situations described above, signaling from BSC 121 indicates to the beacon signal transmitter 109 that a beacon signal including pilot/page/sync channels which are different for frequencies F1–F3 needs to be transmitted to MS 101 to affect handoff in accordance with the invention.

Figure 5:
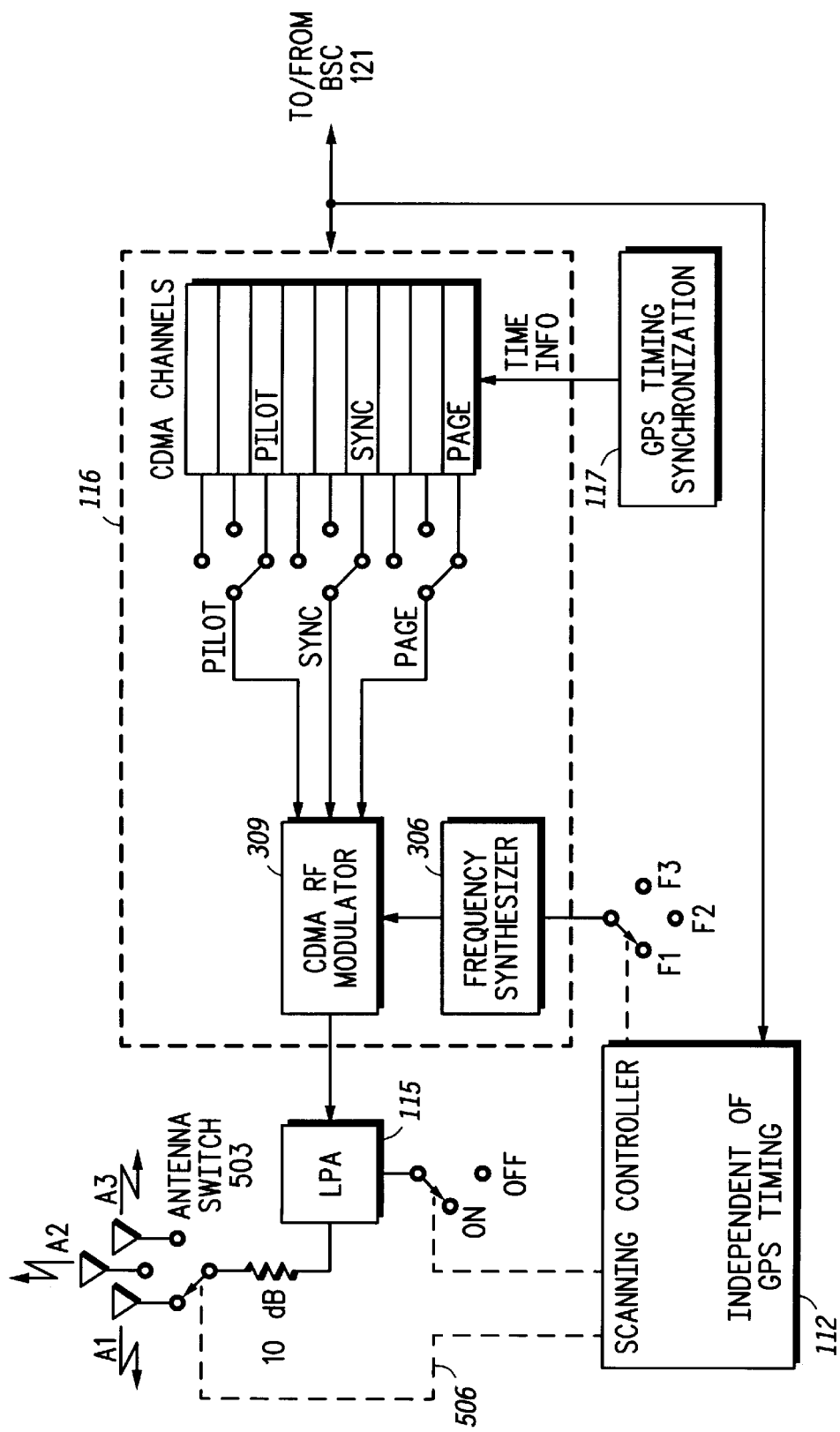
FIG. 5 generally depicts the beacon signal transmitter of FIG. 3 configured to provide a plurality of beacon signals to various sectors of a coverage area in accordance with the invention.

FIG. 5 generally depicts the beacon signal transmitter 109 of FIG. 3 configured to provide a plurality of beacon signals to various sectors of a coverage area in accordance with the invention. As shown in FIG. 5, an antenna switch 503 is added to allow switching of the plurality of beacon signals between sectors A1–A3 of a coverage area served by target base-station 106. To control the transmission per sector A1–A3, an additional control signal 506 is included to control antenna switch 503. In the preferred embodiment, control signal 506 controls antenna switch 503 to switch from sector-to-sector after each of frequencies F1–F3 has been scanned in a particular sector A1–A3. In other words, using the example timing shown in FIG. 2, control signal 506 controls antenna switch 503 to switch from sector-to-sector approximately every 6 seconds. One skilled in the art will appreciate that control of switching from sector-to-sector can be based on other parameters as required by the particular implementation of the CDMA communication system. One skilled in the art will also appreciate that the beacon signal transmitter described with relation to FIG. 4 could likewise be modified to transmit to sectors A1–A3 (or any number of sectors) without deviating from the spirit and scope of the invention.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What I claim is:

1. An apparatus for transmitting a plurality of beacon signals in a wireless communication system, comprising:
   a single transmitter adapted to transmit spread spectrum signals and further adapted to transmit the plurality of beacon signals, the beacon signals having a corresponding plurality of different frequencies, the beacon signals utilized primarily to initiate handoff of a mobile station from a first frequency to a second frequency, the transmitter adapted to scan the beacon signal frequencies;
   a global positioning system (GPS) timing synchronization block coupled to the transmitter, the GPS timing synchronization block adapted to provide timing information; and
   a controller adapted to control the time during which the transmitter transmits the beacon signals at the corresponding plurality of different frequencies.

2. The apparatus of claim 1, wherein the controller is synchronous with the wireless communication system.

3. The apparatus of claim 1, wherein the plurality of beacon signals further comprise a signal having a pilot channel.

4. The apparatus of claim 1, wherein the plurality of beacon signals further comprise a signal having a pilot and synchronization channels.

5. The apparatus of claim 1, wherein the plurality of beacon signals further comprise a signal having a pilot, page and synchronization channels.

6. The apparatus of claim 5, wherein the plurality of beacon signals have common pilot, page and synchronization channels.

7. The apparatus of claim 5, wherein the plurality of beacon signals have different pilot, page and synchronization channels.

8. The apparatus of claim 7, further comprising means for accepting input related to an assignment of the different pilot, page and synchronization channels for each of the plurality of beacon signals.

9. The apparatus of claim 1, wherein the transmitter for transmitting the beacon signals at the corresponding plurality of different frequencies is periodically switched to a different sector of a coverage area.

10. A wireless communication system for handing off a mobile station from a first frequency to a second frequency, the communication system comprising:

at a target coverage area:
   means for transmitting a plurality of beacon signals at a corresponding plurality of different frequencies, said means for transmitting adapted to transmit spread spectrum signals and further adapted to scan the beacon signal frequencies;
   means, coupled to the means for transmitting, for providing GPS timing information;
   means for controlling the time at which the transmitter transmits the beacon signals having the corresponding plurality of different frequencies;

at a mobile station:
   means, based on a received one of the beacon signals, for determining that handoff from the first frequency to the second frequency is required and for initiating the handoff;

at a controller:
   means for instructing the mobile station to handoff from the first frequency the second frequency based on information related to the initiation of the handoff.

11. The communication system of claim 10, wherein the mobile station communicates with a source base-station via a communication signal having a first frequency from the plurality of different frequencies.

12. The communication system of claim 11, wherein the mobile station initiates the handoff based on a comparison between the communication signal having the first frequency from the plurality of different frequencies and the received one of the beacon signals having the first frequency.

13. The communication system of claim 12, wherein the mobile station initiates the handoff based on a comparison of $E_c/I_o$ between the communication signal having the first frequency from the plurality of different frequencies and the received one of the beacon signals having the first frequency.

14. An apparatus for transmitting a plurality of beacon signals in a wireless communication system, comprising:

a single transmitter adapted to transmit spread spectrum signals and further adapted to transmit the plurality of beacon signals, the beacon signals having a corresponding plurality of different frequencies, the beacon signals utilized primarily to initiate handoff of a mobile station from a first frequency to a second frequency, the transmitter adapted to scan the beacon signal frequencies;

a GPS timing synchronization block coupled to the transmitter, the GPS timing synchronization block adapted to provide timing information; and a controller adapted to control the transmitter to transmit the beacon signals at times different from one another.

15. A method of transmitting a plurality of beacon signals in a wireless communication system, comprising the steps of:

using a transmitter adapted to transmit spread spectrum signals, transmitting the beacon signals, the beacon signals having a corresponding plurality of different frequencies, the beacon signals utilized primarily to initiate handoff of a mobile station from a first frequency to a second frequency, the transmitter adapted to scan the beacon signal frequencies;

providing GPS timing information to the transmitter; and controlling the time during which the transmitter transmits the beacon signals at the corresponding plurality of different frequencies.

16. The method of claim 15, wherein the plurality of beacon signals further comprise a signal having a pilot channel or a signal having a pilot and synchronization channels.

17. The method of claim 15, wherein the plurality of beacon signals further comprise a signal having a pilot, page and synchronization channels.

18. The method of claim 17, wherein the plurality of beacon signals have either common pilot, page and synchronization channels or different pilot, page and synchronization channels.

19. The method of claim 18, further comprising the step of accepting input related to an assignment of the different pilot, page and synchronization channels for each of the plurality of beacon signals.

20. The method of claim 15, wherein the step of transmitting the beacon signals at the corresponding plurality of different frequencies is controlled to periodically switch the transmission to a different sector of a coverage area.

* * * * *